Patented Apr. 17, 1951

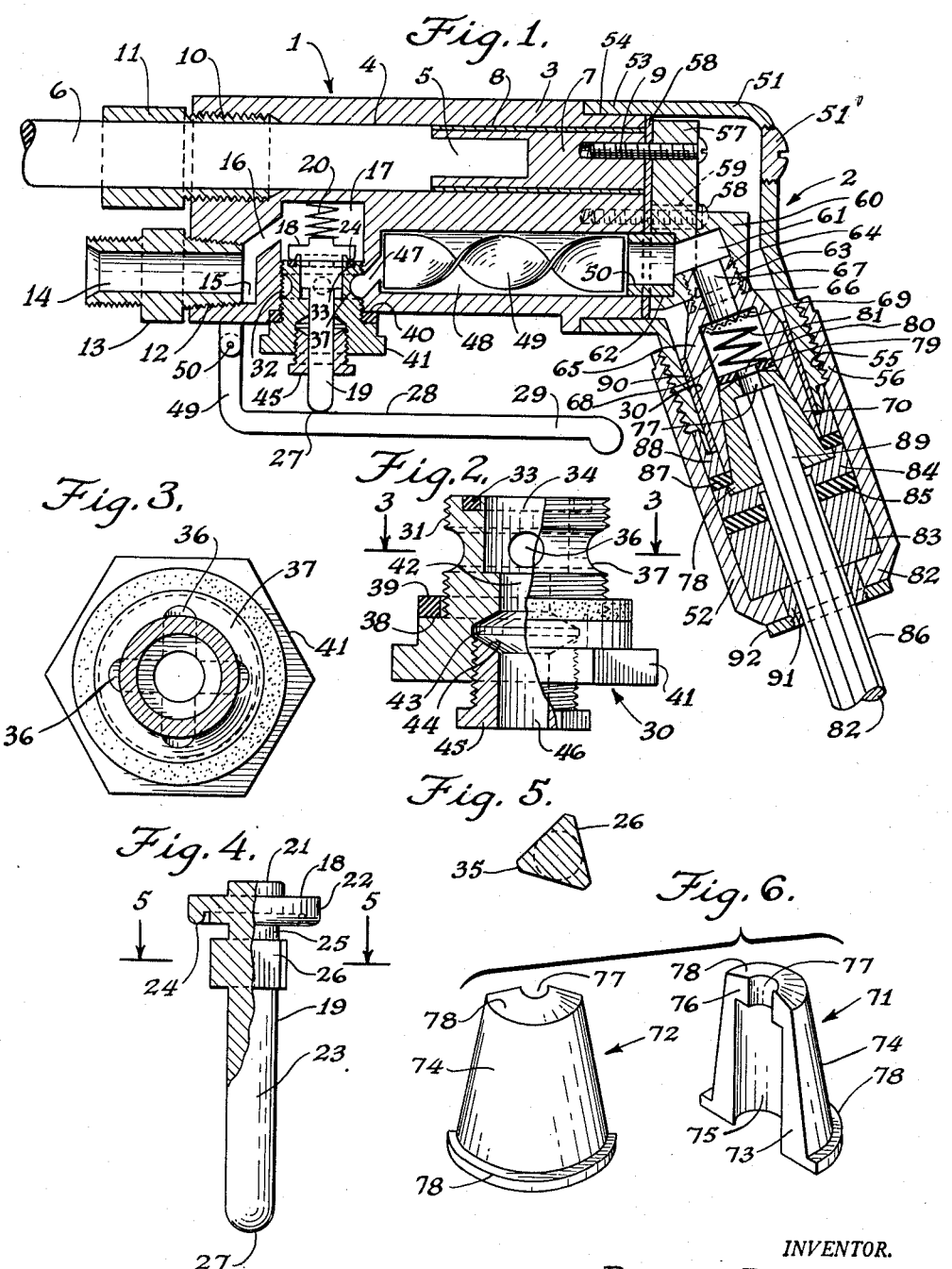

2,549,360

UNITED STATES PATENT OFFICE 2,549,360

WELDING AND CUTTING TORCH

Peter Barbeck, New York, N. Y., assignor to Oxygen Arc Equipment Co. Inc., Brooklyn, N. Y., a corporation of New York Application May 22, 1947, Serial No. 749,733

6 Claims. (Cl. 219—15)

This invention relates to improvements in welding and cutting torches, and in particular to such torches of the electric arc type which are capable of use under water, as well as in the atmosphere.

The torch disclosed in this application incorporates certain improvements over the torch shown and described in Letters Patent No. 2,371,945, granted to me on March 20, 1945. It has been found through the use of torches of this type, particularly for under water work, that extreme ease of installation and removal of cutting electrodes is a most important factor. It has also been found that the repair, or replacement, of a built in, or substantially built in, valve for such a torch, where possible, is very time consuming. If part of the body of the torch itself is used as a portion of the valve, and is accordingly burned, the entire body might need to be replaced. It has also been found that when cutting under water, by using both electric power and oxygen, there is pronounced tendency for flashing back through the gas passage of the electrode and the torch. This is likely to burn out at least the valve and must be checked to whatever extent is possible without interfering with the free forward flow of the gas through the torch. The torch of this invention takes the above and other factors into account and corrects for them by the introduction of novel and effective means as will be pointed out in detail hereinafter.

It is accordingly a principal object of my invention to provide for the ready installation, and replacement, of electrodes for welding and cutting torches.

Another principal object of my invention is to provide a readily removable, and replaceable, valve for such torches.

Another object is to provide a valve which is complete in itself apart from the body of the torch.

Another object is to provide means to prevent damage to such a valve, and to parts of the torch body, by a flashing back in the gas passage of the torch.

A more specific object is to provide readily operable means for positively freeing and partially ejecting the electrode of the torch.

Another specific object is to provide unitary means for retaining part of the anti-flashback mechanism in place, and to urge the electrode chuck in releasing open position.

Further and more detailed objects of the invention will in part be pointed out hereinafter, and in part be obvious from the following description taken in conjunction with the accompanying drawing, in which Figure 1 is a longitudinal sectional view of the torch of my invention taken through the center thereof.

Figure 2 is an elevation partly in section of the body of the valve of my torch.

Figure 3 is a horizontal section of the complete body of the valve taken on lines 3—3 of Figure 2, looking in the direction of the arrows.

Figure 4 is an elevation, with a fragment in section, of the valve plunger.

Figure 5 is a horizontal section of a complete portion of the valve plunger taken on lines 5—5 of Figure 4, looking in the direction of the arrows.

Figure 6 is an exploded view of the elements of the chuck of my torch, with those elements shown in perspective and with one turned at 90° to the other, to show their inside and outside configuration.

Considering the construction of my torch in detail, the same may be generally considered to have two distinct portions, characterized for the sake of convenience as the receiving portion, indicated at 1 and the operating portion, indicated at 2. Each of these portions consists of a housing having special internal characteristics to be referred to.

Considering, first, the receiving housing, 1, the same has a main body portion 3, preferably formed of brass or some other non-corrosive metal. The upper part of portion 3 is formed with a longitudinal bore 4 to receive the terminal end 5 of an insulated conduit or cable 6. The end 5, freed of its insulation in customary manner, is suitably secured in a socket end of the terminal 7. This terminal is insulated from the material of the body portion 3 by an insulating sleeve 8, and is held in position by the securing screw 9, to be referred to hereinafter. The outer end of the bore 4 is screw threaded to receive the screw threaded end 10 of the nipple 11. This nipple assists in holding the cable 6 in place and in making a watertight joint at the end of the conduit 4. From this construction it will be apparent that electric energy can be introduced into the torch without charging the body 3, so long as the insulation retains its efficiency.

The other longitudinal passageway through the entrant portion 1 is employed for the introduction of oxygen, so that the same may eventually emerge at the end of a hollow cutting electrode when the torch is employed for cutting. Thus, at the entrant end of the longitudinal passageway, as shown at 12, the same is formed with a tapered pipe thread to receive a hose-coupling 13 having a gas passage 14 therethrough. The passage 14 opens into a chamber 15 which communicates through the port 16 into the upper free end of the valve chamber 17. Any gas following such a path would, by acting against the upper face 18 of the valve plunger 19, serve to assist the spring 20 in keeping the valve closed.

Considering now the construction of the valve in detail, it is seen that the plunger 19 is suitably provided at its upper end by some means, such as the projection 21 to locate and receive the closing spring 20 just referred to. The other end of the spring 20 abuts against the end of the chamber 17. The upper face 18, in the form of an annular surface, is provided by a collar 22 which extends a substantial distance laterally, with respect to the stem 23 of the plunger. The collar 22 is provided around its underside with an annular seating surface 24, suitably formed to seat against an appropriate portion of the valve body. Beneath the collar 22 the plunger has a short extension 25 of reduced diameter. Below the extension 25 the plunger is again extended laterally this time into an elongated substantially triangular formation 26, best shown in Figure 5. This formation has a suitable length to enable it to ride properly with the valve chamber shortly to be described.

The valve stem 23 terminates in a rounded or other suitably formed end 27, so that the same may ride easily upon the inner surface 28, of an upwardly operable valve handle 29. This valve handle, and the manner of operating the valve by it, are particularly designed for this type of torch as will be explained hereinafter.

The valve body, generally shown at 30, has an upper reduced screw threaded portion 31, for screw threaded reception with the lower screw threaded portion 32 of the valve chamber 17. The upper face of the portion 31 is annularly recessed to receive a gasket 33, suitably sized and positioned to serve as a receiving surface for the seat 24 on the valve plunger. In addition, the reduced upper portion 31 of the valve body is internally bored to form a chamber 34. This chamber is of a diameter to receive the triangular formation 26 of the valve plunger 19, so that the flattened corners 35 of the portion 26 engage the wall of the chamber 24 in a sliding bearing fit.

The lower portion of the chamber 34 is provided with horizontally extending ports 36 which, as shown, are four in number, of opposite ends of diameters at right angles to each other. These ports extend out through the upper portion of the valve body to communicate with an annular channel 37 in the nature of a depression, semicircular in cross section, extending around through this portion of the valve.

At the base of its threaded portion 31, the valve body extends outwardly in a shoulder 38, which shoulder receives a gasket 39 for liquid sealing engagement against the annular seat 40 on the body of the portion 1. Below the portion providing the shoulder 38 the valve body extends out further into a polygonal shaped head 41, which may be a hexagon, octagon or other figure suitable for turning engagement by a wrench.

The base of the chamber 34 is provided with a centrally disposed communicating bore 42 sized to slideably receive the stem 23 of the valve plunger 19. An enlarged chamber 43 is formed at the end of the bore 42 for the reception of packing material. This packing material is forced into packing engagement with the stem 23, by means of the inclined surface 44 on a packing sleeve 45, threadedly secured in the lower end of the valve body 30. The sleeve 45 is formed with a bore 46 complementary to the bore 42, so that an adequate guideway is provided for the movement of the stem 23 of the plunger 19.

Referring to Figure 1, it will be readily seen that I have devised a valve for apparatus of this type which is complete in and of itself, without relying upon any portion of the entrant part of the torch for a working surface. When the plunger 19 is seated in the body 30 and a suitable spring, such as that shown at 20, is seated over the projection 21, the valve body may be screwed in place in the lower portion of the chamber 17 by engagement of the screw threaded portion 31 with the lower screw threaded receiving portion 32. When tightened with a wrench to properly compress the gasket 40, the valve body will be in such position that the channel 37 is aligned with the port 47 which continues the gas passage on into the chamber 48. True, the spring 20 engages the base of the chamber 17, but it is very unlikely that such contact will damage the surface of the chamber. Thus, the valve is an element in and by itself, and should it become defective in any manner, it can readily be removed and replaced by an effective counterpart.

The valve handle 29, previously referred to, has a right angled portion 49, which is pivoted at 50 to the body of the entrant portion 1 of the torch. Thus, the portion 29 of the handle, besides lying normally parallel to the body portion 1, extends towards the operating portion 2, of the torch. This renders it unobtrusive under operating conditions. The valve handle may be swung, about the pivot 50, well out of the way of the valve so that it can be readily removed and replaced. Furthermore, there is no fixed connection between the handle 29, and the valve plunger 19. There is merely the action of the surface 28 against the end 27 with nothing engaged which might need disengagement. Hence, should the valve become faulty on account of a flash back, or for any other reason, it can be quickly replaced without disturbing any of the rest of the torch.

Considering briefly the operation of the valve, it will be apparent that the same is normally kept closed, not only by the action of its spring 20, but also by the pressure of the gas entering through the port 16 into the chamber 17, and acting against the surface 18 of the valve head. To cause the gas to pass, then, one needs to squeeze upward on the handle 29, thus pushing up the plunger 19, which action unseats the surface 24 from the gasket 33. This enables the gas to flow in underneath the seat 24, around the reduced stem 25, and down into the spaces formed between the faces of the triangular portion 26 and the opposed face of the chamber 34. Thus, the gas can flow out through the ports 36, around the channel 37 and through the port 47 into the chamber 48. On release of the handle 29, the spring 20, and the pressure of the gas on the surface 18, quickly close the valve. Thus the valve seat 24 engages the gasket 33 and seals off the passageway through the valve.

The chamber 48, into which the gas passes through the port 47, extends throughout substantially the rest of the length of the entrant portion 1. This chamber is substantially enlarged in diameter as against the size of the passage 47, but the actual passageway through it is restricted by means of a twisted baffle member 49. This member 49, preferably, though not necessarily, of material such as brass, bronze or copper extends throughout the length of the chamber 48, and causes gas passed therethrough to adopt a tortuous course. Thus, should any flash back occur and get as far back into the torch as the chamber 48, the same would be substantially dissipated before reaching the valve 30. The exit end of the chamber 48 is constricted, and the baffle member 49 is maintained in place, by means of a sleeve 50. This sleeve of plastic or other electrical insulating material, extends from the chamber 48 into the operating portion of the torch.

This operating portion 2 of the torch has an outside metallic covering of brass, bronze or other material resistant to the action of sea water, as is the body of the receiving portion 1. This outer covering of the receiving member consists generally of an elbow coupling member 51, and a chuck operating sleeve nut 52. The elbow coupling 51 commences with an annular portion 53. This portion overlies the end of the receiving portion 1, and is secured to the receiving seat 54 thereof by heating, and shrinking on, or some other suitable means. The coupling 51 then extends at right angles with respect to the direction of the receiving portion 1, and finally straightens out slightly towards its original direction to terminate in the threaded end 55. This threaded end receives the inner threaded portion 56 of the sleeve nut 52. The coupling member 51 is also provided with suitably located openings closed by means of set screws, as shown at 51, to provide access to the securing screws in the interior, as will appear hereinafter.

The electric current and gas, if such is being used, are introduced through separate passages in the receiving portion 1, as already pointed out, but are reduced to a single passage through the operating portion 2 by means of the connecting head 57. This head 57 overlies the right hand end of the receiving member 1, is insulated therefrom by an interposed disc of insulating material 58, and is insulated from the elbow coupling 51 by being spaced therefrom around its edges, as is apparent from the showing in Figure 1. The head 57 is secured to the end of the receiving member 1 by the screw 9, which also serves as the conductor of electric current from the terminal 7 to the head 57. Additional securing is achieved by one or more screws such as 58 each of which is insulated from the head 57 where it extends therethrough, by means of an insulating sleeve 59, and is engaged with the body of the receiving portion 1 at an unchanged portion thereof. The lower portion of the head 57 is provided with an outwardly and downwardly extending coupling portion 60. This portion furnishes an interior chamber 61 communicating at the left (in Figure 1) with the opening through the insulating sleeve 50 and opening downwardly in a threaded opening 63. The outer end of the sleeve 50 is received in an annular recess 62 in the head 57. The threaded opening 63 receives the reduced threaded end 64 of the gas conduit and chuck holder 65. Suitable gasketing, as shown at 66, is provided to prevent gas leakage at this joint.

The reduced end 64 of the chuck holder is formed with a bore, or gas passage, 67, communicating with the chamber 61 at its outer end, and, at its inner end, with an elongated chamber 68 in the main body of the chuck holder. A screen 69 is seated in the end of the chamber 68 to overlie the opening of the passage 67 there into. This screen is of material suitable to retard any flash back which might occur when the tool is being used with a hollow electrode. Should any flash back pass through this screen it will then be partially trapped by having to change directions suddenly in the chamber 61. If successful in getting by that, it will be further slowed down and dissipated by the twisted member 49 before it can get back to burn the valve. This flashing back, with consequent burning and possible disabling of cutting torches, is particularly prevalent where the work is being done under water and is subject to heavy water pressures. Such possible injury to the torch is largely overcome by the various types of baffling I employ. By combining screening, changing direction and dissipating I have introduced a composite baffling which cuts the effect of the flashback down to a negligible factor. About the only element it might effect would be the valve and, as already pointed out, I have provided a novel, unitary valve which is complete within itself and may be readily removed for replacement purposes should it be damaged in any manner or from any cause.

The chamber 68 of the chuck holder 65 opens outwardly in a long sloping conical mouth 70 of considerable extent. This mouth, as shown, receives the two identical halves 71 and 72 of my novel chuck as shown per se in Figure 6. Since these halves have all parts in common, only one need be described, with the same reference characters being applicable to each. It is of course to be understood that though I have herein illustrated a two part chuck, and presently consider such a chuck to be the preferred construction, I do not, however, intend my invention to be considered as limited thereto. Chucks of a greater number of equal sections could be made operable in accordance with the teachings of my invention.

The identical halves 71 and 72 of my chuck, when brought together and registered with each other, form a truncated cone. The longitudinal body portion thereof, 73, has an outer conical surface 74, which is complementary to the conical surface 70 of the chuck holder 65. Internally each body portion 73 is formed with its half of an axially aligned cylindrical bore 75 terminating at end 76 where it communicates with a smaller axial bore 77. The outside surface of the end 76, indicated at 78, is inclined upwardly from the outer surface 74 to the border of the bore 77. The provision of this surface forms an important feature of this aspect of my invention. It provides a rocking seat for the elements of the chuck causing them to rock apart when mounted in a manner shortly to be described. Finally, each chuck element is provided around its other end with its respective portion of a laterally, outwardly, extending flange 78.

Reverting back to Figure 1, it will be seen that the chuck elements, when received within the conical mouth 70 of the chuck holder 65, have their bottom 78, or at least the border of it around the bore 77 seated on an annular washer 79, whose center opening 80 is aligned with the bore 77. The washer 79 is maintained in contact with the end surface 78 by means of a suitable spring 81 of substantial strength. This spring extends from the opposite end of the chamber 68, or rather from the screen overlying that end, to the under face of the washer 79. The washer 79 thus serves as a seat for the inclined surface 78 of the chuck. Hence as the chuck is freed for axial movement and the spring 81 forces the washer 79 against the surface 78 the chuck elements will rock on their portions of the surface 78 and open up to permit extraction and replacement of an electrode, shown at 82.

When the torch is in use, however, and until it is desired to remove the electrode, or insert a new one, the chuck elements are maintained in closed position with the parts thereof set together as if the chuck were a one piece cone. This position is maintained by a suitable tightening of the sleeve nut 52. Considering this nut in detail it is seen that the same has a restricted annular end 82. The hollow inside of the nut is filled with sections of insulating material 83 and 84 between which there is interposed a sealing gasket 85 for engagement with the insulation collar 86 interposed over the outer surface of the electrode 82. This sealing gasket 85, when compressed between the plastic elements 83 and 84, has nowhere to escape to, so merely grips the insulation sheath 86 and the inside surface of the nut 52 all the more tightly. Another rubber, or comparable flexible gasket 87 is interposed underneath the flange 78 and between the plastic filler portions 84 and 88. This serves to prevent the escape of gas between the conical surfaces 70 and 74.

From the foregoing it is believed to be apparent that when the sleeve nut 52 is properly tightened down, the plastic element 84 will act against the flanged end 78 of the chuck and force the chuck elements 71 and 72 inwardly, with respect to the inclined mouth 70 of the chuck holder 65. This will overcome the action of the spring 81 and the chuck elements will come together to tightly grip the end 89 of the electrode located therein. When, however, it is desired to free the electrode, it is merely necessary to retract the sleeve nut 52 by unscrewing it a short distance, whereupon the spring 81 acts against the washer 79 which, in turn, pushes the chuck outwardly, with respect to the inclined mouth 70, and at the same time acts on the rocking surface 78 to force the chuck elements apart as they recede along the surface 70. Obviously, this frees the electrode 82 and enables it to be readily removed and replaced, even under the cumbersome conditions encountered in a diver's operations. This enables the diver to keep right on working without having to come to the surface to free up and replace a stuck electrode.

Finally, particularly, it is to be noticed that the sleeve nut 52 and the elbow coupling 51 are completely insulated from the electric current flowing through the chuck holder. The chuck holder 65 is separated from the threaded end 55 of the elbow coupling by means of a plastic, or other suitable insulation sleeve 90, while at the entrant end of the sleeve nut 52, the electrode is surrounded by an annular plastic extension 91 of the plastic filler 83. The extension 91 is, in turn, maintained in place by means of the plastic lock nut 92.

From the foregoing it is believed to be readily apparent that my improved welding and cutting torch, while maintaining the desirable aspects for undersea and other operation of the torch disclosed in my Letters Patent No. 2,371,945, improves upon the same in manners which enhance its effectiveness and increase its dependability for the purposes intended. In disclosing my invention I have attempted to show the improved features in what I presently consider to be the preferred, and most simple embodiments thereof. It is, of course, to be understood that the scope of the invention is not limited by the particular exemplification disclosed herein, but is only to be considered as affected by such limitations as are imposed upon the claims to follow, by the disclosures of the prior art.

Having disclosed my invention, what I claim as new and desire to secure Letters Patent for is:

1. In a torch of the character described, a body portion, a conduit member for passing a gas through said body portion, a valve chamber adjacent the entrant end of said conduit member, an electrode ejecting chuck at the other end of said conduit member, electrode ejecting mechanism operable in conjunction with said chuck received within said conduit member, said chuck having a gas passage through the body thereof to admit gas to the bore of a hollow electrode secured therein and an anti-flash back formation in said conduit member between said valve chamber and said chuck.

2. In a torch of the character described, a body portion, a conduit member for passing a gas through said body portion, a valve chamber adjacent the entrant end of said conduit member, a flash dissipating member in said conduit beyond said valve chamber, an automatically operable electrode ejecting chuck having a gas passage therethrough at the other end of said conduit member and a flash dispersing member in said conduit adjacent said chuck.

3. In a welding torch, a first housing forming an entrant portion, and a second housing providing electrode holding and gas discharge portions, said first housing having separated electric current conductor and gas conduit portions and said second housing having unitary electric current conductor and gas conduit means, and anti flash back devices seated in the gas conduits of said first and said second housings.

4. In a torch of the character described, a body portion, a chamber for passing gas therethrough formed in said body portion, a valve complete in itself seated in said chamber, said valve being operable against the pressure of said entrant gas, means to directly and readily remove said valve in toto out of the side of said chamber for repair and replacement, an operating member extending outwardly from said valve and an operating handle mounted on the wall of said chamber separately from said valve for actuating the same by an inward actuation against said operating member.

5. In a torch of the character described, a body portion, a conduit member for passing a gas through said body portion, a valve chamber adjacent the entrant end of said conduit member, an electrode ejecting chuck at the outer end of said conduit member, and electrode ejecting mechanism, operable in conjunction with said chuck, received within said conduit member, said chuck having a gas passage through the body thereof to admit gas to the bore of a hollow electrode secured therein.

6. In a torch of the character described, a body portion, a conduit member for passing a gas through said body portion, an electrode ejecting chuck in said body portion at the exit end of said conduit member, and automatically operable electrode ejecting mechanism, operable in conjunction with said chuck, received within said conduit member, said chuck having a gas passage through the body thereof to admit gas to the bore of a hollow electrode secured therein.

PETER BARBECK.

REFERENCES CITED

The following references are of record in the file of this patent:

UNITED STATES PATENTS

| Number | Name | Date |
|---|---|---|
| 1,037,979 | Perkins | Sept. 10, 1912 |
| 1,276,893 | Fischer | Aug. 27, 1918 |
| 1,609,859 | Bond | Dec. 7, 1926 |
| 2,371,945 | Barbeck | Mar. 20, 1945 |
| 2,395,228 | Lininger | Feb. 19, 1946 |
| 2,416,278 | Austin et al. | Feb. 25, 1947 |
| 2,417,650 | Kandel | Mar. 18, 1947 |

FOREIGN PATENTS

| Number | Country | Date |
|---|---|---|
| 12,558 | Great Britain | of 1909 |
| 236,098 | Great Britain | July 2, 1925 |